No. 621,929. Patented Mar. 28, 1899.
J. MACPHAIL.
BUNDLE CARRIER FOR HARVESTERS.
(Application filed June 6, 1898.)
(No Model.) 2 Sheets—Sheet I.
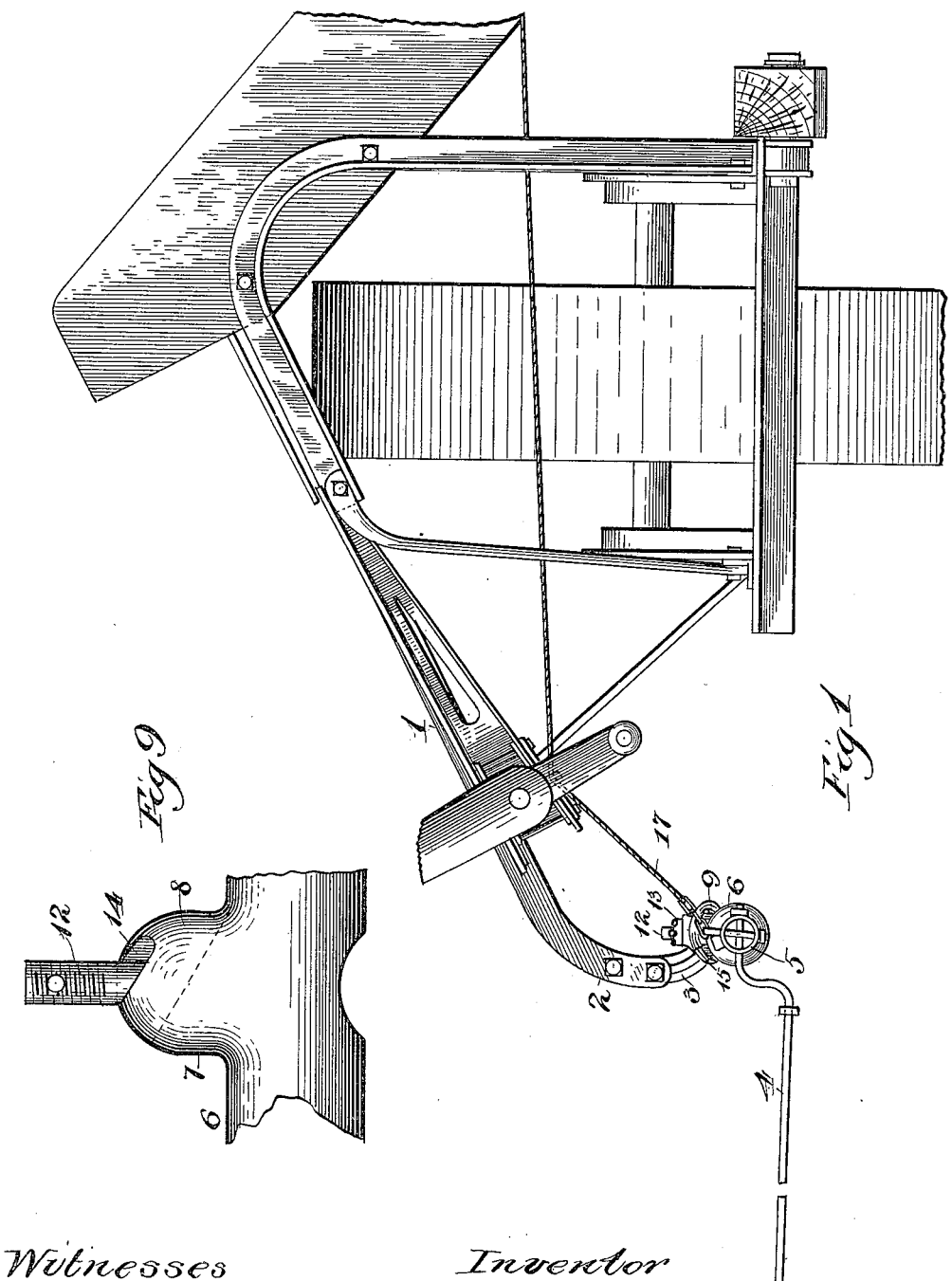
Witnesses
W. C. Corliss
Allan A. Murray
Inventor
James Macphail
By Coburn Hibben & McElroy Attys No. 621,929. Patented Mar. 28, 1899.
J. MACPHAIL.
BUNDLE CARRIER FOR HARVESTERS.
(Application filed June 6, 1898.)
(No Model.) 2 Sheets—Sheet 2.
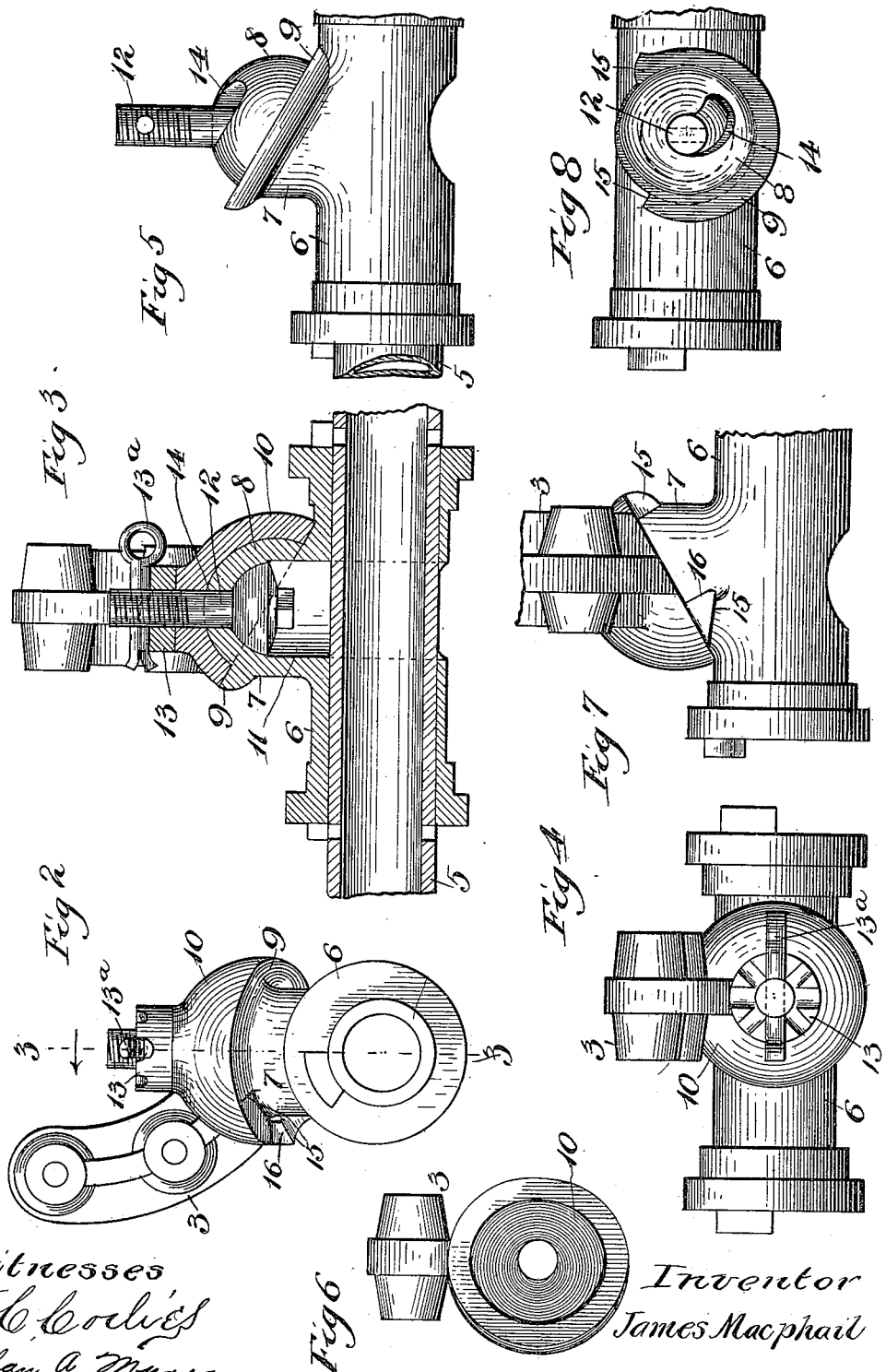
Witnesses
W. C. Coulies
Allan A. Murray
Inventor
James Macphail
By Coburn, Hibben & McElroy Atty/s

UNITED STATES PATENT OFFICE.

JAMES MACPHAIL, OF BLUE ISLAND, ILLINOIS, ASSIGNOR TO THE PLANO MANUFACTURING COMPANY, OF CHICAGO, ILLINOIS.

BUNDLE-CARRIER FOR HARVESTERS.

SPECIFICATION forming part of Letters Patent No. 621,929, dated March 28, 1899.

Application filed June 6, 1898. Serial No. 682,767. (No model.)

*To all whom it may concern:*

Be it known that I, JAMES MACPHAIL, a resident of Blue Island, in the county of Cook and State of Illinois, have invented a certain new and useful Improvement in Bundle-Carriers for Harvesters, of which the following is a specification.

My invention has relation to sheaf-carriers for binders; and its object is to provide a suitable means for permitting the carrier to swing in the proper manner so as to receive the bundles and then to dump them on the ground.

My invention is adapted for use on that class of carriers in which the fingers or arms are at all times extended as distinguished from the class of folding carriers in which the fingers are folded downward and inward toward the machine to dump their load.

In the drawings, Figure 1 is a front elevation of the binder-frame with my carrier in place; Fig. 2, a side elevation of the device embodying my invention; Fig. 3, a sectional elevation on line 3 of Fig. 2; Fig. 4, a plan view of the device; Fig. 5, an elevation of the device, but with the support and socket removed; Fig. 6, a bottom plan of such socket; Fig. 7, a rear elevation of the device as shown in Fig. 3; Fig. 8, a plan view of Fig. 5, and Fig. 9 an elevation of a modified form.

Upon any suitable portion of the harvester or of the binder 1, as shown, is arranged an arm or bracket 2, to which is secured a support 3, whereby the sheaf-carrier is suspended in a novel manner, as hereinafter described, and permitted to swing to dump the bundles.

The carrier comprises a series of arms or fingers 4, which are attached to a head 5, which bears in and is supported by a sleeve 6. This head is not mounted or supported at its middle, but at one side thereof, toward the front, so that it may be said to be unequally poised. Such head is preferably rotatable in the sleeve, so that the fingers may be swung up close to the binder and the machine thus brought into small compass. This sleeve—as shown in Fig. 5, for instance—has a lug or boss 7 with a ball-shaped head 8 and a circular flange 9. This ball-shaped head is received by a hollow cup-shaped socket 10, forming the upper support of the device and preferably integral with the support 3 at the lower end thereof. The lower face of this supporting member or socket may be inclined reversely to the flange 9, so that when the carrier is in receiving position the head 5 is in a horizontal position parallel to and lengthwise of the binder. While I prefer, as shown, to mount the socket upon the binder or harvester and the ball upon the sleeve, it will be understood that such arrangement may be reversed without affecting the operation of my device or departing from the spirit of my invention.

The lug 7 has an interior recess 11, in which fits the lower ball-shaped end of a vertical pin or spindle 12, whose stem extends upwardly through the head 8 and through the socket 10, and which is positioned in a vertical plane lateral to the line of draft. It may be perfectly perpendicular or may deviate therefrom, so long as it remains in said vertical plane. This vertical spindle is held in place by the nut 13 and the cotter-pin 13$^a$, extending through an opening near the upper end of the spindle. To provide for the proper movement of the head or finger support and its sleeve, the head 8 is provided with a circular recess 14.

In order to limit the movement of the head, I arrange projecting lugs 15 upon the boss 7 and corresponding lugs or stops 16 projecting in the path of travel of the lugs 15, so that after the head 5 and sleeve have swung a predetermined distance their further rotation will be interrupted.

The carrier may be held in receiving position and then allowed to dump by any suitable and well-known means, such as the rod or chain 17, secured to the head 5, as shown in Fig. 1, and operated by the driver. When the driver releases the operating chain or cord, the entire carrier is free to swing bodily in a manner such as to discharge or dump the bundles.

In Fig. 9 is shown a modified form of construction in which the flange 9 and the stops are dispensed with; but in other respects this form is similar to the other. The ends of the slots in the head act as the stops for limiting the movement of the carrier.

I do not wish to be understood as limiting myself to minor features and details of construction, as changes may be made without departing from the spirit and scope of my invention and claims.

I claim—

1. The combination, with a harvesting-machine and its bundle-carrier, of a pin for supporting the carrier and upon which it swings downwardly, inwardly and rearwardly, such pin being positioned in a vertical plane transverse to the line of draft.

2. The combination, with a harvesting-machine and its bundle-carrier, of a carrier-support arranged in an unequally-poised position, a hollow lug or projection arranged on the support and provided with a slot and a vertically-positioned pin upon the harvester or binder which slot receives the pin.

3. The combination, with a harvesting-machine and its bundle-carrier, of a ball-and-socket connection and support between the machine and the carrier, a vertical pin passing through the ball and socket and a curved slot provided in such ball-and-socket connection to receive the pin whereby the bundle-carrier may be swung and stopped in its movement by the contact of the ends of the slot against the pin.

4. The combination, with a harvesting-machine and its bundle-carrier, of a hemispherical member upon the carrier, a socket carried by the harvester or binder and engaging said member, and a pin positioned in a vertical plane transverse to the line of draft and adapted to hold the member and socket together, said member being suspended upon the pin, and communicating a downward, inward, and rearward movement to the carrier to discharge the bundles.

5. The combination, with a harvesting-machine and its bundle-carrier, of a lug connected to the carrier and having a ball-shaped head provided with a slot, a socket carried by the harvester or binder and engaging said lug and a vertical pin passing through the ball and socket.

6. The combination, with a harvesting-machine and its bundle-carrier, of a lug connected to the carrier and having a ball-shaped head provided with a slot and also having an inclined circular flange, a socket engaging the ball-shaped head and having its circular edge inclined reversely to said flange and a pin passing through the slot for holding the ball and socket together.

7. The combination, with a harvesting-machine and its bundle-carrier, of a member connected to the carrier and having a ball-shaped head, a socket engaging the ball-shaped head and having its circular edge inclined reversely to said flange and a vertical pin passing through the head and through the socket to hold the same together.

8. The combination, with a harvesting-machine and its bundle-carrier, of a sleeve on which the carrier is suspended, a hollow ball-shaped lug arranged on the sleeve, a socket carried on the machine and engaging the lug and a pin passing through the ball-shaped lug and through the socket, the lug being provided with a curved slot through which the pin passes.

9. The combination, with a harvesting-machine and its bundle-carrier, of a sleeve on which the carrier is suspended, a hollow ball-shaped lug arranged on the sleeve and provided with a slot, a socket carried on the machine and engaging the lug, and a pin passing through the slot in the lug and socket and having a ball at its lower end within the hollow lug.

10. The combination of the head 5 having bundle-carrying fingers 4, a sleeve 6 upon the head, a projection 7 arranged upon the sleeve and having a flange 9 and a ball-shaped head 8 therebeyond, said head having a slot 14, a socket 10 fitting the head 8 and a vertical pin 12 for holding the head 8 in the socket.

11. The combination with a bundle-carrier having a head 5, a sleeve 6 upon the head, a projection 7 arranged upon the sleeve and having an inclined circular flange 9 and a ball-shaped head 8, a socket 10 fitting the head and having its edges inclined reversely to the flange and a vertical pin 12 passing through the head 8 and socket 10 for holding the same together.

12. The combination, with a bundle-carrier having a head 5, a sleeve 6 upon the head, a projection 7 arranged upon the sleeve and having an inclined flange 9 and a ball-shaped head 8 with a slot 14, a socket 10 receiving the head and having a reversely-inclined edge and a vertical pin 12 passing upwardly through the head 8 and socket and adapted to hold the same together.

13. The combination of a harvesting-machine and its bundle-carrier of the always-extended type, of a ball-and-socket connection between the machine and the carrier, a substantially vertical pin holding the ball and socket together and upon which the carrier swings inwardly, downwardly and rearwardly to dump the sheaves, and means on such ball-and-socket connection to limit their movement.

14. The combination, with a harvesting-machine and its bundle-carrier, of a pin for supporting the carrier, upon which it swings rearwardly, downwardly and inwardly to discharge the bundles, such pin being positioned in a vertical plane transverse to the line of draft.

JAMES MACPHAIL.

Witnesses:
L. E. SERAGE,
ALLAN A. MURRAY.